(12) United States Patent
Zemitis et al.

(10) Patent No.: US 7,762,779 B2
(45) Date of Patent: Jul. 27, 2010

(54) TURBINE BLADE TIP SHROUD

(75) Inventors: William Scott Zemitis, Simpsonville, SC (US); Massimiliano Mariotti, Florence (IT); Cody Jermaine Ford, Greenville, SC (US)

(73) Assignee: General Electric Company, Schenectady, NY (US)

( * ) Notice: Subject to any disclaimer, the term of this patent is extended or adjusted under 35 U.S.C. 154(b) by 417 days.

(21) Appl. No.: 11/462,072

(22) Filed: Aug. 3, 2006

(65) Prior Publication Data

US 2008/0038116 A1    Feb. 14, 2008

(51) Int. Cl.
*F01D 5/22* (2006.01)
(52) U.S. Cl. .................. 416/191; 416/192; 416/190; 415/173.4; 415/173.5
(58) Field of Classification Search .............. 415/173.4, 415/173.5, 173.6, 174.4, 174.5, 189, 195; 416/190–192; 277/414, 415
See application file for complete search history.

(56) References Cited

U.S. PATENT DOCUMENTS

| | | | |
|---|---|---|---|
| 5,971,710 A * | 10/1999 | Stauffer et al. | 416/191 |
| 6,164,916 A * | 12/2000 | Frost et al. | 416/189 |
| 6,491,498 B1 * | 12/2002 | Seleski et al. | 416/191 |
| 6,851,931 B1 | 2/2005 | Tomberg | |
| 6,893,216 B2 * | 5/2005 | Snook et al. | 415/173.1 |
| 7,001,144 B2 | 2/2006 | Urban et al. | |
| 7,001,152 B2 * | 2/2006 | Paquet et al. | 416/190 |
| 7,094,032 B2 * | 8/2006 | Seleski | 416/192 |
| 7,396,205 B2 * | 7/2008 | Dube et al. | 415/173.5 |
| 2005/0011978 A1 | 1/2005 | Datcuk, Jr. | |
| 2005/0079058 A1 | 4/2005 | Paquet et al. | |
| 2008/0025841 A1 * | 1/2008 | Norton et al. | 416/191 |

FOREIGN PATENT DOCUMENTS

| | | |
|---|---|---|
| DE | 20023475 U1 | 5/2004 |
| EP | 1413712 A1 | 4/2004 |
| RU | 2161257 C2 | 12/2000 |
| SU | 352030 | 9/1972 |

* cited by examiner

*Primary Examiner*—Edward Look
*Assistant Examiner*—Dwayne J White
(74) *Attorney, Agent, or Firm*—Sutherland Asbill & Brennan LLP

(57) ABSTRACT

A turbine blade tip shroud. The tip shroud may include a platform, a number of Z-notched positioned within the platform, a number of seal rails positioned on the platform, and a number of cavities positioned within the platform and adjacent to seal rails and the Z-notches.

10 Claims, 2 Drawing Sheets

US 7,762,779 B2

TURBINE BLADE TIP SHROUD

TECHNICAL FIELD

The present invention relates generally to gas turbines and more particularly relates to a turbine blade tip shroud with cavities therein so as to reduce the overall mass of the tip shroud.

BACKGROUND OF THE INVENTION

Gas turbine blades often may include an airfoil with an integral tip shroud attached thereto. The tip shroud attaches to the outer edge of the airfoil and provides a surface area that runs substantially perpendicular to the airfoil surface. The surface area of the tip shroud helps to hold the turbine exhaust gases on the airfoil such that a greater percentage of the energy from the turbine exhaust gases may be converted into mechanical energy so as to increase overall efficiency. The tip shroud also provides aeromechanical damping and shingling (fretting) prevention. The relatively high temperature environment and the bending stresses caused by the overhanging material and centrifugal loading on the tip shroud, however, help drive creep (deformation) therein. These bending stresses can cause local high stress concentrations, for example, in the areas of the shroud known as the "Z-notch" and elsewhere.

There is a desire, therefore, for an improved turbine blade tip shroud that reduces creep so as to optimize the maximum bucket lifetime while ensuring that the bucket has acceptable performance and manufacturability. The lifetime of the overall bucket should be improved without sacrificing overall turbine efficiency and costs.

SUMMARY OF THE INVENTION

The present application thus describes a turbine blade tip shroud. The tip shroud may include a platform, a number of Z-notches positioned within the platform, a number of seal rails positioned on the platform, and a number of cavities positioned within the platform and adjacent to the seal rails and the Z-notches.

The seal rails may include a pressure side seal rail and a suction side seal rail. The cavities may have a thickness of at least about 1.72 millimeters and may be positioned at least 2.0 millimeters from Z-notches. The cavities may include a pressure side cavity positioned adjacent to the suction side seal rail. The Z-notches may include first side Z-notch and a second side Z-notch. The pressure side cavity may include a length of about 22.32 millimeters, a width adjacent to the first side Z-notch of about 5.97 millimeters, and a width of about 3.46 millimeters opposite the first side Z-notch. The suction side cavity 160 may include a length of about 21.5 millimeters, a width of about 3.97 millimeters adjacent to the second Z-notch, and a width of about 3.03 millimeters opposite the second side Z-notch. The cavities may have a uniform depth throughout. The tip shroud may be manufactured according to an investment casting process or a machining process.

The present application further describes a turbine blade tip shroud. The tip shroud may include a platform, a number of Z-notches positioned within the platform, a number of seal rails positioned on the platform, and a number of cavities positioned within the platform, adjacent to the seal rails, and at least 2.0 millimeters from the Z-notches.

The seal rails may include a pressure side seal rail and a suction side seal rail. The cavities may have a thickness of at least about 1.72 millimeters. The cavities may include a pressure side cavity positioned adjacent to the pressure side seal rail and a suction side cavity positioned adjacent to the suction side seal rail. The Z-notches may include first side Z-notch and a second side Z-notch. The pressure side cavity may include a length of about 22.32 millimeters, a width adjacent to the first side Z-notch of about 5.97 millimeters, and a width of about 3.46 millimeters opposite the first side Z-notch. The suction side cavity 160 may include a length of about 21.5 millimeters, a width of about 3.97 millimeters adjacent to the second side Z-notch, and a width of about 3.03 millimeters opposite the second side Z-notch. The cavities may have a uniform depth throughout.

These and other features of the present application will become apparent to one of ordinary skill in the art upon review of the following detailed description when taken in conjunction with the drawings and the several appended claims.

DETAILED DESCRIPTION

Figure 1:
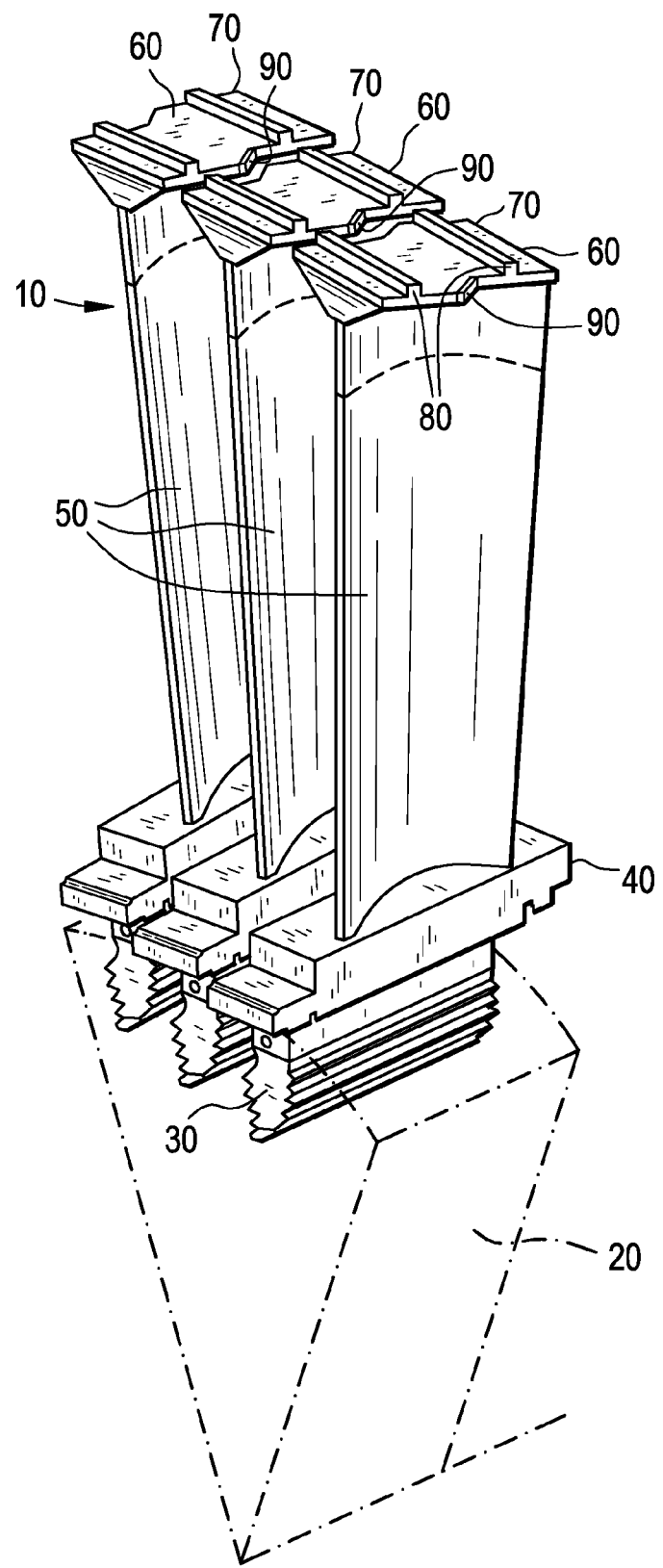
FIG. 1 is a perspective view of known turbine blades with tip shrouds thereon.

Referring now to the drawings, in which like numerals refer to like elements throughout the several views, FIG. 1 shows a number of known turbine blades 10. As is shown, the turbine blades 10 are mounted on a turbine disk 20 for rotation at operating speeds. Each turbine blade 10 may include a root section 30 attached to the disk 20. Each blade 10 further includes a platform section 40 and an airfoil section 50. Positioned on the top of the airfoil section 50 is a tip shroud 60. The tip shroud 60 is positioned largely perpendicularly to the airfoil 50. The tip shroud 60 includes a platform 70 with a number of seal rails 80 positioned thereon. The seal rails 80 generally extend the length of the tip shroud 60. The sides of the tip shroud 60 (on both sides of the airfoil 50) may have a "Z" notch 90 positioned therein. As the name implies, the Z-notch 90 is largely in the shape of a "Z". The Z-notch 90 allows the various blades 10 to interlock.

Figure 2:
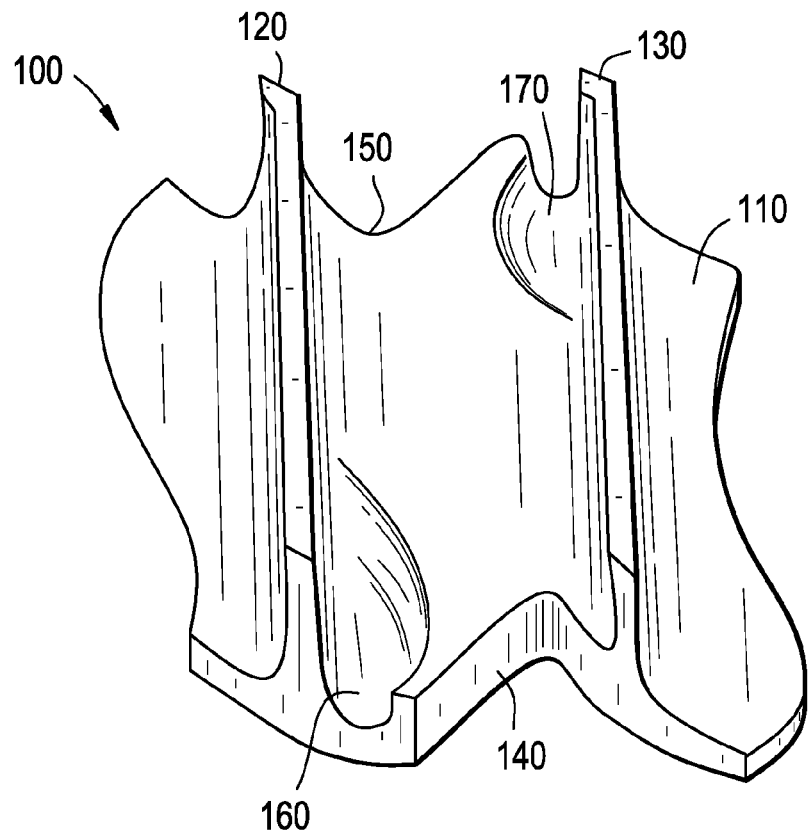
FIG. 2 is a top perspective view of a tip shroud as is described herein.
Figure 3:
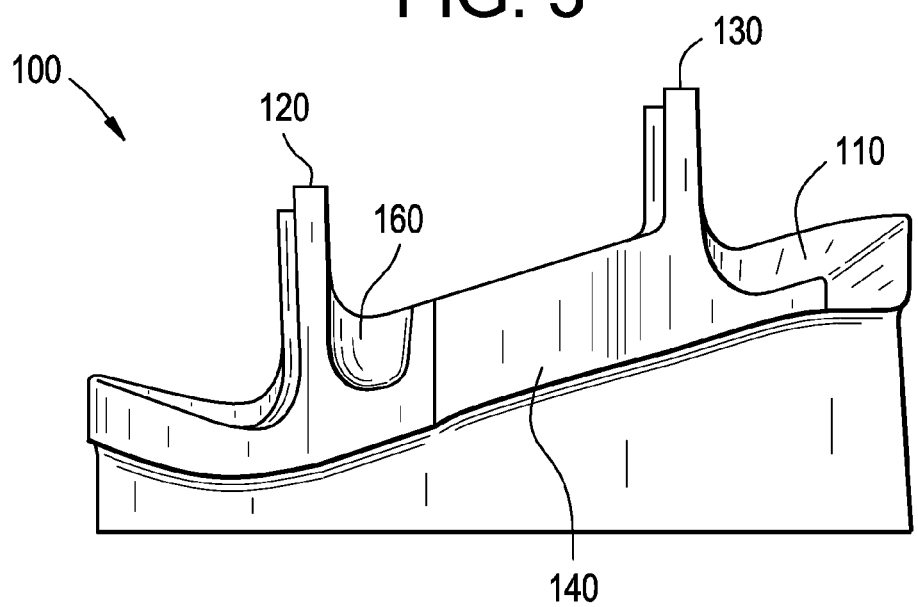
FIG. 3 is a side perspective view of the tip shroud of FIG. 2.

FIGS. 2 and 3 show a tip shroud 100 as is described herein. Similar to the tip shroud 60 described above, the tip shroud 100 includes a platform 110, a pair of seal rails positioned thereon, a pressure side seal rail 120 and a suction side seal rail 130, and a pair of z-notches, a first side Z-notch 140 and a second side Z-notch 150. The pressure side rail 120 may be about 8.51 millimeters from the y-z-plane. The suction side rail 130 may be about 7.75 millimeters from the y-z plane. The tip shroud 100 may have be a distance of about 16.64 millimeters between the seal rails 120, 130. Other structures, shapes, distances, and sizes may be used herein.

The tip shroud 100 further includes a number of cavities, a pressure side cavity 160 and a suction side cavity 170. The cavities 160, 170 are positioned within the platform 110 adjacent to the seal rails 120, 130. The cavities 160, 170 may have a minimum thickness of about 1.72 millimeters within the platform 110 and a minimum wall thickness adjacent to the Z-notches 140, 150 of about 2.0 millimeters. The pressure side cavity 160 may have a length of about 22.32 millimeters, a width adjacent to the first side Z-notch 140 of about 5.97 millimeters, and a width of about 3.46 millimeters opposite the Z-notch 140. The suction side cavity 170 may have a length of about 21.5 millimeters, a width of about 3.97 millimeters adjacent to the second Z-notch 150, and a width of about 3.03 millimeters opposite the Z-notch 150. The cavities 160, 170 may have a largely uniform depth throughout.

The positioning, size, and shape of the cavities 160, 170 may be varied as desired. The dimension described herein may be used with a G4 HSPT (High Speed Power Turbine) stage 1 turbine bucket sold by General Electric Company of Schenectady, N.Y. The tip shroud 100 as a whole and the cavities 160, 170 therein may be made via an investment casting process or via similar manufacturing techniques. For example, a machine process in which the excess material is scooped out also may be used.

The use of the cavities 160, 170 thus reduces the overall mass of the tip shroud 100 and also provides contact region flexibility among the several blades 10. The cavities 160, 170 may be positioned in areas of the platform 110 so as to minimize stress in limiting locations such as the Z-notches 140, 150. Stress reduction achieved about the Z-notches 140, 150 improves creep life for the bucket 10 as a whole. The design of the cavities 160, 170 may be optimized to provide the maximum life benefit while ensuring that the bucket 10 has acceptable performance and manufacturability.

Given that the cavities 160, 170 are positioned in regions that overhang normal to the airfoil 50, lowering the mass of the tip shroud 100 reduces the bending stress while the tip shroud 100 retains adequate sealing and aeromechanical properties. Further, a residual benefit of the use of the cavities 160, 170 is that the contact surface at the bucket interface is more flexible so as to cause the loading between two (2) buckets 10 to be more evenly distributed.

It should be apparent that the foregoing related only to the preferred embodiments of the present application and that numerous changes and modifications may be made herein by one of ordinary skill in the art without departing from the generally spirit and scope of the invention as defined by the following claims and the equivalents thereof.

We claim:

1. A turbine blade tip shroud, comprising:
   a platform;
   the platform comprising a plurality of Z-notches therein;
   a plurality of seal rails positioned on the platform; and
   a plurality of cavities positioned within the platform and adjacent to the plurality of seal rails with a first end opening into the plurality of Z-notches and a second end enclosed by the platform.

2. The turbine blade tip shroud of claim 1, wherein the plurality of seal rails comprises a pressure side seal rail and a suction side seal rail.

3. The turbine blade tip shroud of claim 1, wherein the plurality of cavities comprises a thickness of at least about 1.72 millimeters.

4. The turbine blade tip shroud of claim 1, wherein the plurality of cavities comprises a pressure side cavity positioned adjacent to the pressure side seal rail and a suction side cavity positioned adjacent to the suction side seal rail.

5. The turbine blade tip shroud of claim 4, wherein the plurality of Z-notches comprises first side Z-notch and a second side Z-notch.

6. The turbine blade tip shroud of claim 5, wherein the pressure side cavity comprises a length of about 22.32 millimeters, a width adjacent to the first side Z-notch of about 5.97 millimeters, and a width of about 3.46 millimeters opposite the first side Z-notch.

7. The turbine blade tip shroud of claim 5, wherein the suction side cavity comprises a length of about 21.5 millimeters, a width of about 3.97 millimeters adjacent to the second side Z-notch, and a width of about 3.03 millimeters opposite the second side Z-notch.

8. The turbine blade tip shroud of claim 1, wherein the plurality of cavities comprises a uniform depth throughout.

9. The turbine blade tip shroud of claim 1, manufactured according to an investment casting process.

10. The turbine blade tip shroud of claim 1, manufactured according to a machining process.

* * * * *